June 18, 1968  N. R. HAMM  3,388,750

GROUND PREPARING APPARATUS

Filed Sept. 14, 1964  3 Sheets-Sheet 1

INVENTOR.
Norman R. Hamm
BY
Frishauer and Gold
ATTORNEYS

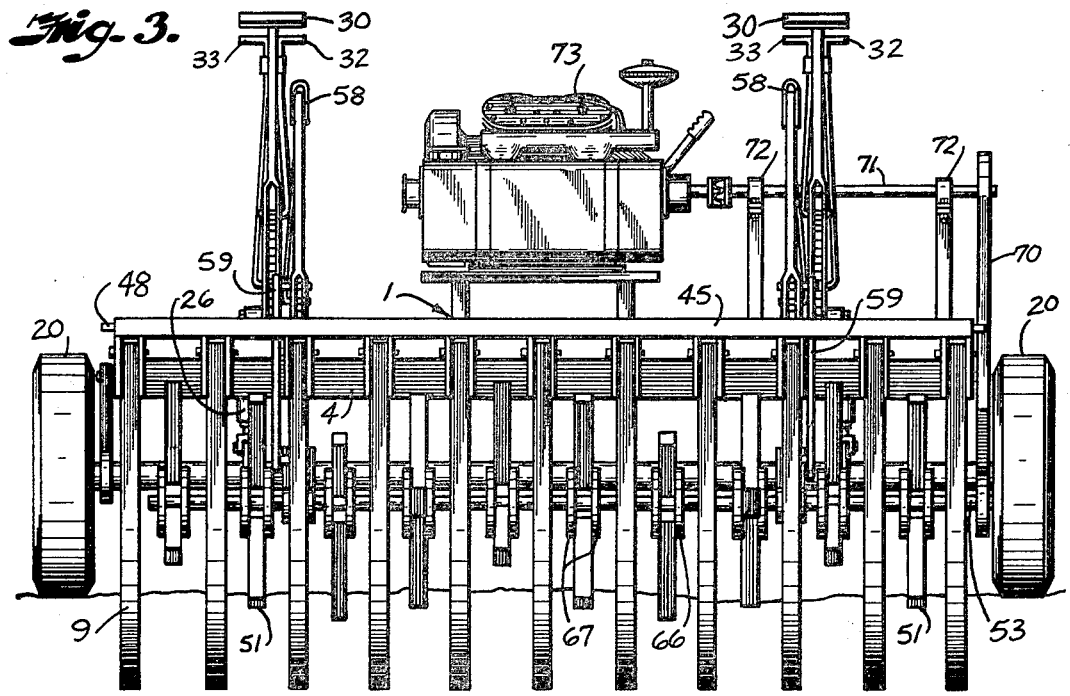
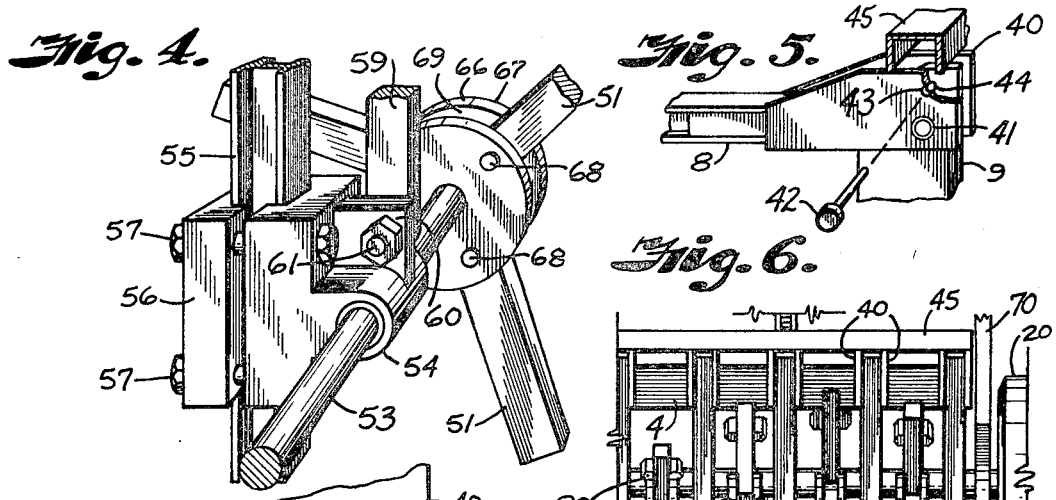
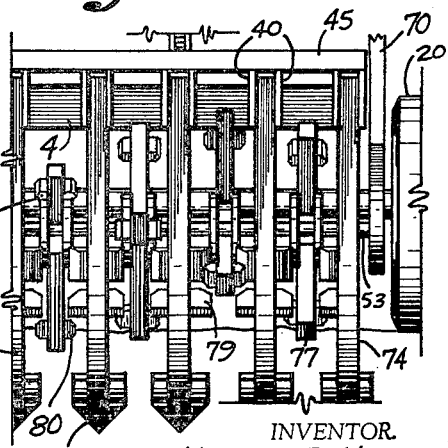
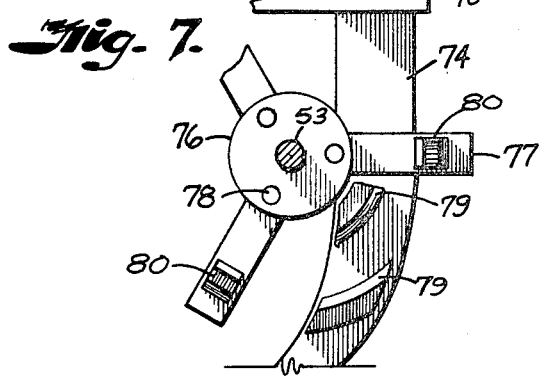

June 18, 1968  N. R. HAMM  3,388,750
GROUND PREPARING APPARATUS
Filed Sept. 14, 1964  3 Sheets-Sheet 3
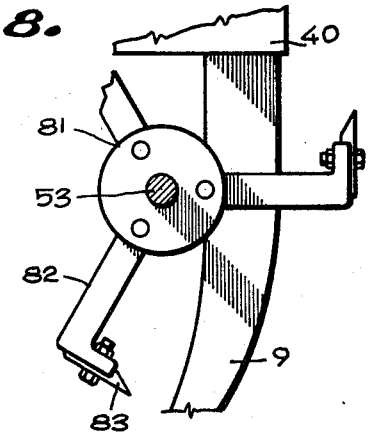
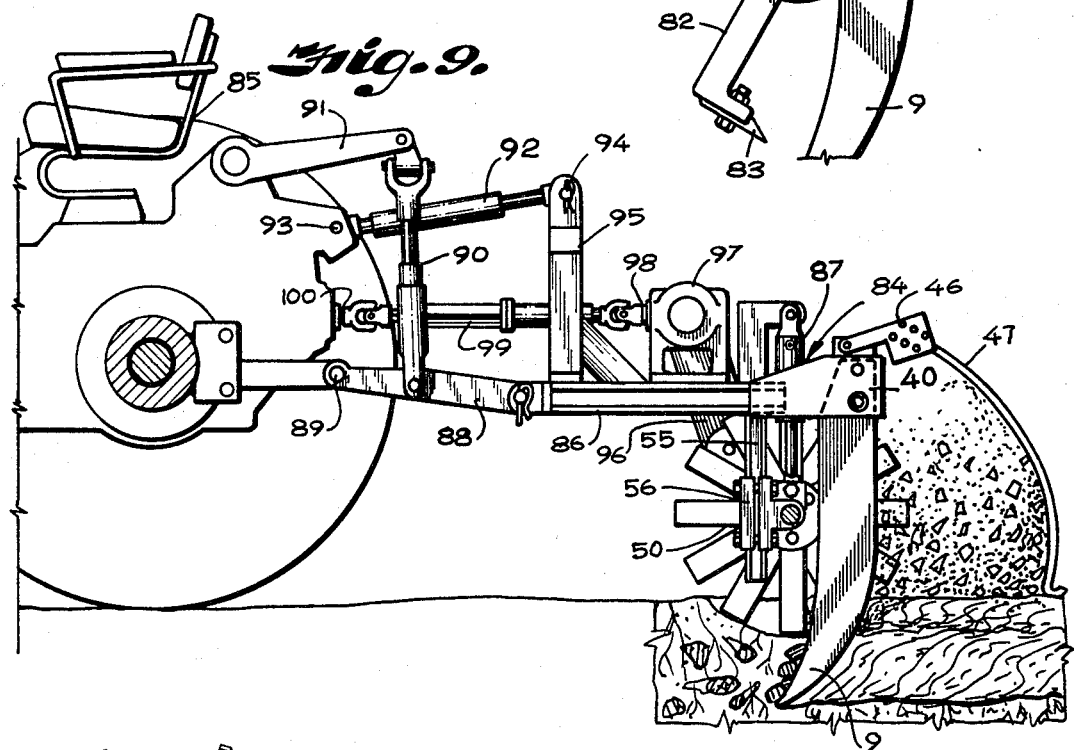
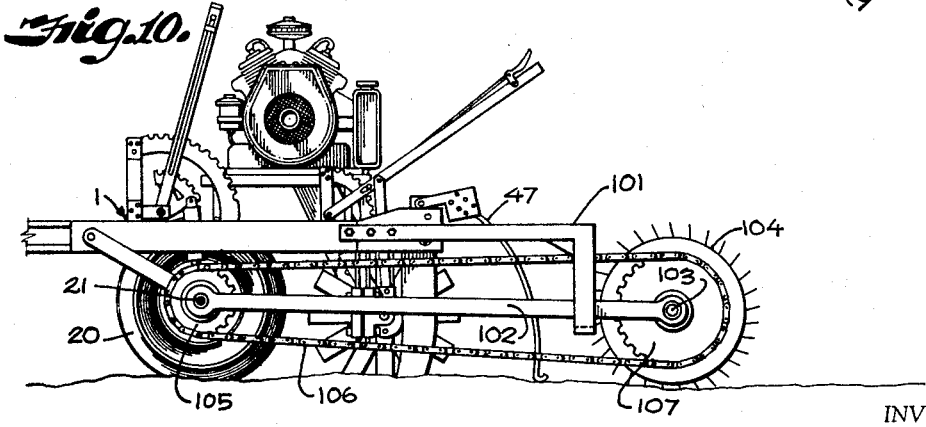
INVENTOR.
Norman R. Hamm
BY
Fishburn and Holl
ATTORNEYS

United States Patent Office 3,388,750
Patented June 18, 1968

3,388,750
GROUND PREPARING APPARATUS
Norman R. Hamm, P.O. Box 107,
Perry, Kans. 66073
Filed Sept. 14, 1964, Ser. No. 396,259
7 Claims. (Cl. 172—45)

ABSTRACT OF THE DISCLOSURE

A ground preparing apparatus for clearing and working soil to prepare a seed bed. The apparatus has a mobile frame designed to be connected to a tractor, a plurality of laterally spaced shanks mounted thereon and depending therefrom, a rotor supporting a plurality of sets of pivotally mounted flail hammer blades, and power means operatively connected to the rotor to rotate same said hammer blades moving between said shanks. The shanks have a forwardly curved portion terminating in a point which penetrates the ground, whereby the soil is lifted upwardly along the curved edges of the shanks where the hammer blades crush the soil. An arcuate hood is pivotally mounted in a trailing relation to said apparatus and has one edge thereof which engages the worked soil and grades and levels same. The rotor is vertically adjustable relative to the ground and the frame.

In the working and clearing of ground, problems may be presented by roots that remain in the ground after removing of the trees and stumps. Also, even after ground has been cultivated there may be green or dry weeds, cornstalks, brush or other material either standing or lying on the ground that must be removed or reduced in order to properly cultivate the ground. Repeated cultivation at the same depth may result in a hardpan under the ground and, in some instances, sub-soilers and the like have been used for ripping the hardpan to promote penetration of moisture. While such devices will rip the earth, they leave the soil in large pieces and also smaller ones in the form of hard clods that are difficult to break up even with many passes of harrows and other working tools. As the result, it requires a number of implements and many passes of each in time-consuming toil to work the cleared soil or soil having growth thereon into a fine seed bed.

The principal objects of the present invention are to provide a ground preparing apparatus which will pick up material on and in the soil and reduce same to a small particle size or fine condition; to provide such an apparatus that is adjustable for different depths whereby only material on the ground surface may be lifted and reduced or the ground may be ripped at a substantial depth to break the hardpan and both surface growth, roots and clods and the like will be reduced to small size; to provide a ground working apparatus for efficient use on ordinary prairie land, row crop land or other land being prepared for planting to clean the ground and provide a seed bed thereon with sub-surface cracks providing sub-drainage of the cultivated area; to provide such apparatus that includes a mobile frame structure with depending laterally spaced tooth, chisel or shovel carrying shanks that are forwardly curved for picking up and lifting material and also providing a pointed tip to extend into the ground as the apparatus is moved thereover; to provide such an apparatus having mechanism for raising and lowering the frame relative to the ground wheels to thereby alter the depth to which the points on the shanks penetrate into the ground; to provide such an apparatus with a rotor having a plurality of hammers or beaters pivotally mounted thereon whereby said hammers or beaters act as flails to strike material raised by the shanks; to provide such a structure wherein the rotor has tines for tilling as the soil is broken by the shanks; to provide such an apparatus wherein the rotor is adjustably carried by the frame immediately forwardly of the shanks with the hammers aligned with spaces between the shanks so that the hammers will pass therebetween as the rotor is rotated whereby the hammers and shanks cooperate in reducing material therebetween; to provide such a structure with means for raising and lowering the rotor to vary the relative position of the lower portion of the arc of hammer travel relative to the points on the shanks and thereby the relative depth to which the hammers and points penetrate; to provide such a structure with cooperating lugs on the hammers and shanks to aid in reducing large material as it is caught between the lugs of the shank and the hammers moving thereby; to provide such an apparatus for preparing ground wherein power means rotates the rotor at high speeds and the hammers on the rotor cooperate with the shanks to efficiently reduce material picked up by the shanks and tools thereon as the shanks move with the frame over the ground with the desired penetration of the points on the shank into the ground to rip same; and to provide such a structure that is for the purpose set forth and is strong, durable, compact and thoroughly efficient in use for the intended purpose.

Other objects and advantages of this invention will become apparent from the following description taken in connection with the accompanying drawings wherein are set forth by way of illustration and example certain embodiments of this invention.

FIG. 1 is a side elevational view of a ground preparing apparatus embodying the features of the present invention with portions broken away to show the rotor and shanks.

FIG. 2 is a top plan view of the apparatus with the rear shield removed.

FIG. 3 is a rear elevational view of the apparatus with the rear shield removed to show the arrangement of the rotor hammers or elements and the shanks.

FIG. 4 is an enlarged fragmentary perspective view of the rotor and shaft bearing mounting and depending frame columns.

FIG. 5 is an enlarged fragmentary perspective view of the connection of the shanks to the frame.

FIG. 6 is a fragmentary rear elevational view of an apparatus with a modified form of hammers and shanks.

FIG. 7 is a fragmentary sectional view through the rotor and shanks of the modified form, particularly illustrating the arrangement of the lugs thereon.

FIG. 8 is a fragmentary sectional view showing a further modified form of rotor with the shanks wherein the rotor has tines for tilling.

FIG. 9 is a fragmentary side elevational view of a tractor-mounted ground preparing apparatus with portions broken away to show the structure thereof.

FIG. 10 is a fragmentary side elevational view of a form of ground preparing apparatus with a rotary harrow connected thereto.

Referring more in detail to the drawings:

The reference numeral 1 generally designates ground preparing apparatus which includes a mobile frame 2 which, in the illustrated structure, is adapted to be drawn by a suitable draft means such as a tractor or the like (not shown). In the structure illustrated, the frame 2 is generally rectangular in shape and comprises front and intermediate beams 3 and 4 interconnected at outer ends by longitudinal beams 5 and 6. The beams have extension portions 7 which extend rearwardly from the intermediate beam 4. There are also a plurality of rearwardly extending beam portions 8 spaced one from the other and adapted to carry shanks or teeth 9, as later described.

The rearward extensions 7 of the longitudinal beams 5 and 6 and the intermediate rearward portions or extensions 8 therebetween are all preferably interconnected by a transversely extending reinforcing bar 10 arranged rearwardly of the intermediate beam 4 to provide strength and rigidity to the extensions.

A tongue member 11 extends forwardly from the frame 2 and has a portion 12 between the beams 3 and 4 and a forward portion 12' which is connected by angled braces 13 forwardly of the frame, said angle braces extending rearwardly and being connected to the frame members as at 14 and 15. Diagonal braces 16 extend from the rear end of the tongue 11 to the forward outer ends of the frame. The forward end of the tongue 11 preferably has a suitable clevis or other connecting member 17 for connection with a drawbar 18 of a tractor or the like by suitable pin or other connector 19.

The frame 2 is carried on spaced wheels 20 which, in the illustrated structure, are rotatably mounted on an axle 21 which is carried on ends 22 of hangers 23 in the form of arms having their forward ends pivoted as at 24 on the ends of the frame adjacent the forward beam 3. The hanger arms 23 are inclined downwardly and rearwardly from the pivotal points 24. The arms 23 are vertically adjustable for the purpose of elevating and lowering the wheels 20 to vary the distance between the frame 2 and the ground. The arms 23 when so adjusted are latched in such position with the frame 2. For this purpose in the illustrated structure, the axle 21 has pivotally connected thereto as at 25 the lower ends of vertically disposed members 26 each of which have their upper ends connected as at 27 to one end portion of a respective arcuate rack member 28 pivotally mounted on a pin or shaft 29 on the same axis as the pivot of a respective level 30. The pin 29 also is at the axis of a quadrant or rack 31 fixed as by rackets to the frame 2. The levers 30 have handles 32 and 33 that operate pawls 34 that engage in teeth 35 and 36 of the racks 28 and 31 respectively. With this arrangement, movement of the levers 30 and engagement of the pawls 34 with the teeth of the rack 28 provide an engagement whereby movement of the lever will move that rack 28 and the element 26 to raise and lower the wheels relative to the frame to a selected position, at which time the pawl 34 is engaged with the teeth 35 of the rack 31 to make the initial positioning of the wheel and frame.

In the illustrated structure, the element 26 is a hydraulic cylinder or extensible member adapted to receive fluid pressure through a line 37 which has a suitable connection 38 for a source of pressure, as for example from a tractor (not shown) to provide for control of the extension and contraction of the element 26 thereby providing a variation quickly accomplished in the relative height of the wheels and frame or the frame from the ground as it is moved thereover.

A plurality of laterally spaced shanks 9 are mounted on the frame 2 and depend therefrom, said shanks each terminating at their lower ends in a forwardly curved portion with a point 39 to penetrate the ground. The shanks are heavy, rigid members with the portion adjacent the frame substantially rectangular in cross-section with the longer dimension longitudinally of the direction of travel of the apparatus to provide maximum rigidity in that direction. The curved portion at the lower end of the shank is preferably such that when it penetrates the ground the angle of approach provides what is termed "suction" so that the forces tend to hold the point of the shank in the ground as it is moved therethrough. The shanks are preferably equally spaced across the width of the frame and may be rigidly secured thereto. However, in the illustrated structure, there are spaced plate members 40 fixed on and extending rearwardly from the extensions 8 to provide a pair of such plates for each shank. The shanks are each arranged between respective pairs of plates and pivoted thereon by means of a pin 41 and normally held in operating position as illustrated in FIG. 1 by means of a shear pin 42 that extends through apertures 43 in the plates and through an aligned or registered aperture 44 in the shank arranged between the respective plates, the shear pin being such that if excessive force which might bend or otherwise damage the apparatus is applied to the shank tending to swing it rearwardly relative to the frame the shear pin will break allowing the respective shank to swing upwardly and rearwardly, which position will be maintained until the apparatus is raised and the shank swung back to normal position and a new shear pin 42 inserted in the apertures. In order to provide rigidity for the shank mountings, a transverse beam 45 is secured to each of the plates along the top edges thereof whereby the rear of the pairs of plates provide an opening so as not to interfere with any swinging movement of the shank. Mounted on the beam 45 are arms 46 that carry a hood or shiled 47 that extends downwardly and rearwardly behind the apparatus as illustrated in FIG. 1, the arms being pivotally mounted as at 48 to the beam 45 whereby the hood will swing upwardly in response to upward and rearward forces acting thereon, as for example uneven ground engaging the lower edge 49 of the hood.

A rotor 50 is supported from the frame 2 in depending relation with the axis of rotation of the rotor transversely of the frame and forwardly of the shanks 9. The rotor includes a plurality of beater or hammer members 51 pivotally mounted on the rotor in circumferentially spaced relation and on axes spaced radially outwardly of and parallel to the axis of rotation of the rotor. It is preferred that the hammers or beaters 51 be arranged in sets moving substantially in vertical planes that extend between adjacent shanks with the axis of rotation of the rotor arranged close to the forward edges of the shanks whereby the beaters or hammers pass between said shanks in the rotation of the rotor. In the structure illustrated in FIGS. 1 to 5 inclusive, the rotor 50 is preferably adjustable up and down relative to the frame 2 to vary the space between the path of the outer edges of the hammers and the points of the shanks.

The rotor includes a shaft 53 rotatably mounted in bearing members 54 which are mounted on depending standards 55 fixed to the frame or certain of the extensions 8 thereof. In the structure illustrated, the bearing members 54 are provided with clamp plates 56 engaging the opposite sides of the standards whereby tightening of bolts 57 will clamp the bearing members and plate into tight engagement with the standard to hold same in selected position. When it is desired to raise or lower the rotor, levers 58 each of which is connected by a link 59 to an ear 60 on the respective bearing member by a pivotal connection 61 are moved by actuating a handle 62 to release a pawl 63 from engagement with teeth 64 of a quadrant 65 fixed on the frame. Movement of the levers raises or lowers the bearing members 54 and then the detents or pawls 63 engage the respective tooth of the quadrants to hold the rotor in the selected adjusted position. Bolts 57 are then tightened so that it will remain in position during further operation. Fixed on the rotor are a plurality of spaced members 66 providing spaced annular portions 67 which have circumferentially spaced pins 68 mounted therein and extending across the spacing or grooves 69 in which one end of the beaters or hammers 51 extend, said one end being pivotally mounted on the pins 68. In the structure illustrated, there are three beaters mounted on each of the members 66, said beaters preferably being rectangular in cross-section and arranged end-wise relative to the path of travel, as for example the beaters may be of heavy material such as two-inch steel one-inch thick or more. The rotor is arranged whereby there is a set or series of beaters pivotally mounted on a member 66 fixed on the shaft 53 for each space between shanks whereby the beaters will move between said adjacent shanks. This arrangement provides a series of beaters for each space between the shanks across the width of the apparatus, as illustrated in FIG. 2. Power means is provided for driving the rotor and, in the illustrated structure, there is a housing 70 enclosing suitable transmission mechanism for driving the rotor in response to rotation of an input shaft 71 of said housing. The input shaft may be driven from a power take-off of a tractor (not shown) or any other suitable power source. In the illustrated structure, the shaft 71 is supported in bearing standards 72 extending upwardly from the frame 2 with said shaft coupled to an engine 73 for providing the power to rotate the rotor.

In using a structure constructed and assembled as described, with the wheels 20 lowered relative to the frame whereby the point 39 of the shank is out of the ground, the apparatus is arranged whereby the hitch 17 is connected to a draft vehicle such as a tractor (not shown) and then if it is desired to pick up and beat or break material on top of the ground the bolts 57 are loosened and the levers 58 moved to lower the rotor whereby the circle of the outer ends of the hammers will be adjacent the points 39 of the shanks. Then, the bolts 57 are tightened and the levers 30 manipulated to raise the wheels 20 relative to the frame whereby the points 39 of the shanks will penetrate slightly into the ground and thereby lift all material on the surface. Power is supplied to the rotor to rotate same and then the apparatus is pulled over the ground with the shanks picking up the material and the rotor hammers or beaters striking the material as it moves up on the shanks and extends across spacing therebetween to beat, break and reduce the material into fine particles that would be thrown rearwardly against the hood 47 and deposited on the ground rearwardly of the apparatus.

For clearing of ground and breaking up roots and the like, it is preferred that the rotor be raised so that the hammers only penetrate slightly into the ground when the points of the shanks are down to a depth that is desired for removal of roots. Then, by moving the apparatus over the ground with the rotors rotating, the shanks will strike roots and the like in the ground and cause same to move upwardly on the forwardly curved surface of the shanks and, as they pass into the path of the beaters, they are broken and reduced. A suitable position for such operation is illustrated in FIG. 1. When it is desired to work the soil to provide a seed bed, the wheels and rotor are adjusted relative to the frame whereby the shanks will penetrate to the desired depth and the hammers will have an arc of their outer ends that will extend a suitable distance below the surface of the ground. Then, with the rotor operating, the apparatus is moved forwardly and not only rips the ground but also to thoroughly beat same into a fine pulverized condition, working any pulverized material such as cornstalks, weeds or the like that was on the surface into the soil as it is tilled. This provides not only a fine seed bed but also a ripped condition of the ground that allows moisture to penetrate below the hardpan that frequently occurs under the top soil.

In the form of the invention illustrated in FIGS. 6 and 7, the shanks 74 have shovels or other ground working tools 75 secured to the lower ends thereof. Also, the support for the bearings of the shafts of the rotor 76 are fixed relative to the frame at a constant distance therebelow. The hammers or beaters 77 on the rotor 76 are also pivotally mounted by pins 78 to act as flails or the like that will extend radially outwardly when rotated at high speed. The sides of the shanks 74 have spaced lugs 79 mounted thereon and the beaters have lugs 80 on the sides thereof whereby as the rotor 76 is rotated at high speed the beaters 77 pass between the shanks 74 and the lugs 80 pass between the lugs 79 whereby there is a smaller spacing and grinding of the material into a smaller particle size as it passes between the lugs. Otherwise, the operation is the same as described relative to FIGS. 1 to 5 inclusive.

In the form of the invention illustrated in FIG. 8, there is mounted on the shaft 53 a form of rotor 81 which in place of the hammer 51 has arms or tines 82 preferably terminating at their outer ends in sharpened points 83 so that as the shanks 9 break the ground rotation of the rotor 81 causes the points of the tines to cut into the broken soil and till same, reducing the soil for the depth at which the tines penetrate to a fine particle size that will form a good seed bed.

In the form of the invention illustrated in FIG. 9, the ground preparing apparatus 84 is mounted and carried by a tractor 85 preferably at the rear thereof, with connections from the frame 86 of said apparatus to the tractor being such that the frame, rotor and shanks can all be raised and lowered whereby it can be positioned above the ground as in traveling and have various ground penetrations in working soil. The structure, arrangement and mounting of the shanks 9 on members 40 at the rear of the frame 86 are substantially as shown and described relative to the structure illustrated in FIGS. 1 to 5 inclusive. The rotor 50 is also of the same structure as shown and described in FIGS. 1 to 5 inclusive and is mounted in bearings 56 carried by depending members 55 which may be raised and lowered relative to the frame by suitable lifting mechanism which, in the illustrated structure, is a hydraulic ram 87 which may be controlled from the hydraulic system (not shown) on the tractor 85. The forward end of the frame 86 is pivotally connected to the rear of arms 88 which have forward ends pivoted as at 89 on the tractor. These arms 88 form lift arms which are raised and lowered through a connection 90 with an arm 91 mounted on the tractor and raised and lowered through hydraulic or other suitable actuating mechanism, as in conventional practice. In order to give stability to the structure in its various positions, a stabilizing link 92 is pivotally mounted as at 93 on the tractor and has a rear end pivotally connected as at 94 to an upstanding bracket 95 on the forward end of the frame 86. The rotor 50 is driven by a transmission mechanism in housings 96 from a gear box 97 that has an input shaft 98 connected by the drive shaft 99 to a power take-off shaft 100 of the tractor. In this manner, the power for rotating the rotor is obtained from said power take-off, and the change of depth is by the lift mechanism on the tractor; otherwise, the operation in preparing ground is substantially the same as that of the apparatus described relative to the structure shown in FIGS. 1 to 5 inclusive.

In the form of the invention illustrated in FIG. 10, the ground preparing apparatus 1 is substantially the same as illustrated in FIGS. 1 to 5 inclusive with an additional rearward extension 101 serving as a guide for rearward arms 102 that extend from the axles 21 of the wheels 20 and support axles 103 for a rotary harrow 104. The rotary harrow may be of conventional structure and is preferably positioned behind the guard member 47 with said harrow driven from the rotation of the wheel 20 as by a sprocket 105 connected thereto operatively engaged through a chain 106 with a sprocket 107 connected to the rotary harrow 104. In this structure, the ground and reduced material provided by the apparatus 1 is further worked and smoothed into a suitable condition to form a very desirable seed bed.

It is believed obvious that the apparatus is arranged for variation in the positioning of the rotor and shank points as well as the depth of penetration into the ground of each so that it is capable of reducing surface material, ripping the ground, removing roots, grinding or reducing surface material as the ground is ripped, as well as ripping the ground and pulverizing the clods and the like to form a fine seed bed. Also, each of the beaters tend to be radial of the rotor as they are rotated at high speeds, but when striking objects, they provide a hammer blow and will pivot rearwardly if the object struck is immobile.

It is to be understood that while I have illustrated and described certain forms of my invention, it is not to be limited to the specific form or arrangement of parts herein described and shown except insofar as such limitations are included in the claims.

What I claim and desire to secure by Letters Patent is:

1. A ground preparing apparatus comprising,
    (a) a mobile frame,
    (b) a plurality of rigid shanks mounted on said frame in depending laterally spaced relation, said shanks being substantially equally spaced one from the other with each of said shanks terminating at lower ends in leading ground penetrating tool points, said shanks having leading edges curved upwardly and rearwardly from the respective points,
    (c) mobile means supporting said frame and adjustable to vary the position of said shank points from above the ground to a depth under the ground surface for working of the ground to such depth,
    (d) a rotor supported on said frame adjacent to and forwardly of said shanks and adjustable up and down relative thereto,
    (e) a plurality of laterally spaced sets of flail hammer blades, each set having a plurality of said flail hammer blades pivotally mounted on the rotor in circumferentially spaced relation, said sets of flail hammer blades being laterally spaced in offset relation to the shanks with their path of travel in response to rotation of the rotor being between adjacent shanks,
    (f) and means driving said rotor to rotate same at relatively high speed so that in the lower portion of the path of the hammers they are disposed radially and move toward said leading edges of said shanks to break and crush material picked up by said shanks.

2. A ground preparing apparatus including:
    (a) a mobile frame,
    (b) a plurality of rigid shanks mounted on said frame in depending laterally spaced relation in a transverse line relative to said frame, said shanks being substantially equally spaced one from the other with each of said shanks terminating at lower ends in leading ground penetrating tool points,
    (c) said shanks having leading edges curving upwardly and rearwardly from the respective points for upward movement of roots and like material picked up by the shank points,
    (d) mobile means supporting said frame and adjustable to vary the position of said shank points from above the ground to a depth under the ground surface for working the ground to such depth,
    (e) a rotor supported on said frame adjacent to and forward of said shanks with the axis of rotation transverse to the frame and forward of the shanks,
    (f) a plurality of laterally spaced sets of flail hammer blades, each set having a plurality of flail hammer blades pivotally mounted on the rotor in circumferentially spaced relation, said sets of flail hammer blades being laterally spaced in offset relation to the shanks with their path of travel in response to rotation of the rotor being between adjacent shanks, said flail hammer blades having a pivotal axis spaced radially outward from the axis of rotation of the rotor,
    (g) means driving said rotor to rotate same at relatively high speed so that in the lower portion of the path of the flail hammer blades they are disposed radially and move toward the leading edges of the shanks to break and crush material picked up by the shanks,
    (h) a plurality of standards depending from the frame,
    (i) means associated with said frame to vertically adjust the rotor relative to the frame and shank points to vary the spacing of the lower arc of the flail hammer blades and the shank points,
    (j) means associated with said standards to secure the rotor in the selected positions relative to the frame and shank points,
    (k) an arcuate hood extending from the frame above the shanks to the ground rearwardly thereof for the width of said frame with hinge means connecting the hood to the frame whereby the hood can swing upwardly and rearwardly relative thereto, said hood engaging the ground to grade and level same.

3. A ground preparing apparatus including:
    (a) a mobile frame,
    (b) a plurality of rigid shanks pivotally mounted on said frame in depending laterally spaced relation in a transverse line relative to said frame, said shanks being substantially equally spaced one from the other with each of said shanks terminating at lower ends in leading ground penetrating tool points, said shanks being individually fixed in working position by a shear pin,
    (c) said shanks having leading edges curving upwardly and rearwardly from the respective points for upward movement of roots and like material picked up by the shank points,
    (d) mobile means supporting said frame and adjustable to vary the position of said shank points from above the ground to a depth under the ground surface,
    (e) a rotor supported on said frame adjacent to and forward of said shanks with the axis of rotation transverse to the frame and forward of the shanks,
    (f) a plurality of laterally spaced sets of flail hammer blades, each set having a plurality of flail hammer blades pivotally mounted on the rotor in circumferentially spaced relation, said sets of flail hammer blades being laterally spaced in offset relation to the shanks with their path of travel in response to rotation of the rotor being between adjacent shanks, said flail hammer blades having a pivotal axis spaced radially outward from the axis of rotation of the rotor,
    (g) means driving said rotor to rotate same at relatively high speed so that in the lower portion of the path of the flail hammer blades they are disposed radially and move toward the leading edges of the shanks to break and crush material picked up by the shanks,
    (h) spaced laterally extending arcuate lugs on said shanks,
    (i) laterally extending straight lugs on the flail hammer blades that pass between the lugs on the shanks as the rotor is rotated to reduce material between said lugs,
    (j) a plurality of standards depending from the frame,
    (k) means associated with said frame to vertically adjust the rotor relative to the frame and shank points to vary the spacing of the lower arc of the flail hammer blades and the shank points,
    (l) means associated with said standards to secure the rotor in the selected positions relative to the frame and shank points,
    (m) an arcuate hood extending from the frame above the shanks to the ground rearwardly thereof for the width of said frame with hinge means connecting the hood to the frame whereby the hood can swing upwardly and rearwardly relative thereto, said hood engaging the ground to grade and level same.

4. An apparatus as set forth in claim 1 wherein the rotor is vertically adjustable relative to the frame and including,
    (a) a plurality of standards fixed to and depending from the frame,
    (b) rotor supporting means vertically adjustable to selected positions on the standards,
    (c) means securing said rotor supporting means in said selected positions,
    (d) said shanks being in the form of a tooth having a leading edge curving upwardly and rearwardly from the point for upward movement of material picked up by the ground penetrating shank points, said teeth depending from the frame and in a transverse line relative thereto, (e) said rotor being arranged with the axis of rotation transversely of the frame and forwardly of said teeth with a set of flail hammer blades for each space between adjacent teeth.

5. An apparatus as set forth in claim 2 wherein the mobile means supporting the frame is a tractor and including,
  (a) lift mechanism connected to said tractor and frame whereby operation of said lift mechanism varies the position of the shanks and rotor relative to the ground,
  (b) the power means driving the rotor being operatively connected to said tractor,
  (c) and power mechanism operatively connected to said tractor and operative to vertically adjust said rotor relative to said frame and shank points.

6. An apparatus as set forth in claim 2 and including,
  (a) a rearward frame extension,
  (b) a rotary drum harrow having a plurality of laterally and circumferentially spaced outwardly extending spikes,
  (c) power transmission means connected to said harrow for rotating same,
  (d) means associated with the frame extension for guiding said drum harrow in a trailing relation to the frame extension whereby the harrow reduces the material worked by the shanks and rotor.

7. An apparatus as set forth in claim 4 wherein an arcuate hood extends from the frame above the shanks to the ground rearwardly thereof for the width of said frame with hinge means connecting the hood to the frame whereby the hood can swing upwardly and rearwardly relative thereto, said hood engaging the ground to grade and level same.

References Cited

UNITED STATES PATENTS

| | | | |
|---|---|---|---|
| 359,780 | 3/1887 | Fulton | 172—271 |
| 375,741 | 1/1888 | Gilmore et al. | 172—39 |
| 571,130 | 11/1896 | Darling | 172—45 |
| 1,571,481 | 2/1926 | Kasmeier | 43—144 |
| 1,844,124 | 2/1932 | Jordan | 172—271 |
| 1,956,186 | 4/1934 | Wyatt | 172—65 |
| 2,539,136 | 1/1951 | Hite | 172—65 |
| 2,633,687 | 4/1953 | Bannister | 172—39 |
| 2,754,744 | 7/1956 | Hall | 172—112 |
| 2,785,613 | 3/1957 | Staats | 172—45 |
| 2,787,943 | 4/1957 | Browning | 172—78 |
| 2,795,176 | 6/1957 | O'Hara | 172—76 |
| 2,910,129 | 10/1959 | Howard | 172—78 |
| 2,966,948 | 1/1961 | Ulsh | 172—122 |

FOREIGN PATENTS 11,286 A.D. 1846 Great Britain.

ABRAHAM G. STONE, *Primary Examiner.*

J. R. OAKS, *Assistant Examiner.*